United States Patent [19]

Greune et al.

[11] 4,173,119
[45] Nov. 6, 1979

[54] CONTROL SYSTEM FOR A GAS TURBINE ENGINE, ESPECIALLY A VEHICULAR GAS TURBINE ENGINE

[75] Inventors: Christian Greune, Furstenfeldbruck; Friedrich Hackl, Neu-Esting, both of Fed. Rep. of Germany

[73] Assignee: Motoren- und Turbinen-Union Munchen GmbH, Fed. Rep. of Germany

[21] Appl. No.: 390,844

[22] Filed: Aug. 23, 1973

[30] Foreign Application Priority Data

Aug. 23, 1972 [DE] Fed. Rep. of Germany ....... 2241363

[51] Int. Cl.$^2$ ............................ F02C 7/02; F02C 9/02; F02C 9/08
[52] U.S. Cl. ............................... 60/39.16 R; 60/39.25; 60/39.28 R
[58] Field of Search .............. 60/39.28 R, 39.16, 39.25

[56] References Cited

U.S. PATENT DOCUMENTS

| | | | |
|---|---|---|---|
| 3,019,604 | 2/1962 | Hall | 60/39.28 T |
| 3,421,317 | 1/1969 | Bedford | 60/39.28 R |
| 3,523,423 | 8/1970 | Young | 60/39.28 R |
| 3,606,754 | 9/1971 | White | 60/39.28 R |
| 3,777,479 | 12/1973 | Hagen | 60/39.28 R |
| 3,780,527 | 12/1973 | Lewis | 60/39.25 X |
| 3,844,114 | 10/1974 | Nonnenmann | 60/39.25 X |

*Primary Examiner*—Robert E. Garrett
*Attorney, Agent, or Firm*—Craig and Antonelli

[57] ABSTRACT

A control system for a gas turbine engine, especially a vehicular gas turbine engine, having a speed governor responsive to a controlled variable which is the speed of a gas generator shaft for providing an output to control fuel flow to the engine, a temperature regulator device responsive to a controlled variable which is the gas temperature of the gas generator of the engine for providing an output to control the positioning of variable guide vanes of the engine, and a control arrangement for controlling the controlled variable and outputs of the speed governor and temperature regulator device as a function of the engine characteristics to ensure optimum engine operation.

70 Claims, 3 Drawing Figures

CONTROL SYSTEM FOR A GAS TURBINE ENGINE, ESPECIALLY A VEHICULAR GAS TURBINE ENGINE

The present invention relates to control system for a gas turbine engine and, more particularly, to a control device for a vehicular gas turbine engine having a gas generator including an air compressor and a gas turbine on a common gas generator shaft, a combustion chamber, a free power turbine, especially one having an inlet row of variable guide vanes, and prefereably a compressor air to exhaust gas heat exchanger, a speed governor the controlled variable of which is the speed of the gas generator shaft and which varies the fuel flow, a temperature regulator the controlled variable of which is a gas temperature of the gas generator turbine and which varies the throughput of the gas generator by, e.g., varying the position of the guide vanes, Effective power comes from the free power turbine of this two-spool engine which drives to the vehicle wheels through a transmission. The heat exchanger is a compressor outlet air to free power turbine exhaust gas heat exchanger. The control device may also include a temperature regulator which varies the throughput of the gas generator by extracting effective power from it.

A broad object of the present invention is to provide a control system for ensuring optimum engine operation in terms of overall engine efficiency, the times required to change the torque in the free power turbine and the life of the hot engine components.

Another object of the present invention is to economize signaling devices to benefit the operational reliability and cost of control units.

It is a further object of the present invention to provide a control system for varying the controlled variables ($N_1$, $T_{t4}$) as well as the manipulated variables or output quantities (B/K, $\Delta \alpha_1$) of two controllers (units 4 and 13) as a function of engine characteristics ($N_{2,1}$, $T_{t1,4,6}$) with at least two of these controlled variables and manipulated variables or output quantities being varied as a function of one and the same engine characteristic ($T_{t1}$).

In accordance with a feature of the present invention, the influence of the inlet temperature ($T_{t1}$) of the engine on its output is reduced by varying the speed ($N_1$) of the gas generator shaft, either specified or actual, as a function of this inlet temperature at each operating position or power lever angle with the specified or actual speed ($N_1$) being preferably changed proportionally to the square root of this inlet temperature to a reduced speed ($N_1 \sqrt{T_{t1}}$) at each operating position or power lever angle.

According to another feature of the present invention, limitation of the maximum possible output of the engine is achieved by varying the maximum value of the so-changed specified speed as a function of this inlet temperature ($T_{t1}$) (unit 2). It also is useful to reduce the specified speed of the gas generator shaft with the aid of a speed limit governor (unit 1) to control the nominal speed ($N_{2N}$) of the free power turbine, where in the upper speed range of the gas generator shaft the gas generator is normally throttled to the maximum possible inlet temperature of the gas generator turbine to ensure favorable specific fuel consumption. In order to prevent engine shutdown in service situations where the specified speed of the gas generator shaft and hence the fuel flow is heavily reduced, it is helpful to provide the control system with a selective logical circuit (unit 3) to ensure a minimum speed of the gas generator shaft.

In accordance with an advantageous feature of the present invention, the control system is provided with a limit temperature regulator (unit 6) which additively or alternatively reduces the manipulated variable or the output quantity (B/K) of the speed governor to limit the fuel flow when the gas generator picks up speed. In this manner, separation of the flow in the air compressor and/or overtemperature of the hot engine components can be prevented during acceleration of the gas generator shaft.

According to another feature of the present invention, the specified value of the limit temperature regulator agrees with the specified value of the former temperature regulator (unit 13) or is formed from the latter specified value ($T_{t4\ spec}$) and a corrective value ($\Delta T_t$). The corrective value-a temperature difference-is preferably adjustable. In accordance with an advantageous aspect of this invention and when the gas exhaust temperature ($T_{t4}$) of the gas generator turbine is used as the controlled variable of the two temperature regulators, the specified value of the limit temperature regulator is corrected (unit 7) as a function of the difference between specified and actual speed ($N_1 = N_{1\ spec.} - N_{1act}$) to compensate for the increase in gas generator turbine gradient which occurs by opening the guide vanes during acceleration of the gas generator turbine. It is likewise useful to correct the specified value of the limit temperature regulator as a function of the position of the guide vanes.

In accordance with further feature of the present invention, the stability of the speed governor and/or of the limit temperature regulator, particularly of the latter, is improved by multiplying the output quantity (B/K) of the speed governor or of the speed governor and the limit temperature regulator by a single or compound engine characteristic (K) in a multiplier (unit 9). The limiting of the output quantity (B/K) to a maximum value $((B/K)_{max})$ and/or a minimum value $((B/K)_{min})$ simultaneously achieves in a relatively simple manner a maximum fuel quantity and/or a minimum fuel quantity varying with the engine characteristic. In an advantageous embodiment of this invention, the maximum value $((B/K)_{max})$ is varied in the starting range or throughout the entire speed range by a single or compound engine characteristic and/or by an external signal, such as by manipulation on the part of the operator. As a compound engine characteristic, use is preferably made of the reduced speed ($N_1/\sqrt{T_{t1}}$) (unit 5).

According to a feature of the present invention, as a controlled variable of the temperature regulator (unit 13) use is preferably made of the gas exhaust temperature ($T_{t4}$) or of the gas inlet temperature ($T_{t3}$) of the gas generator turbine. In an embodiment of this invention, stationary control of the gas temperature of the gas generator turbine is achieved by varying the specified value of the temperature regulator (unit 13) to obtain the most favorable specific fuel consumption as a function of the inlet temperature ($T_{t1}$) of the engine or of it and the reduced speed $((N_1/\sqrt{T_{t1}})$ act.) of the gas generator shaft (unit 11). It is advantageous if this specified value is proportional to the product of this inlet temperature and a function of the reduced speed, such as $T_{t4\ spec} = K_1 T_{t1} \times f(N_1/\sqrt{T_{t1}})$, where $k_1$ is a constant value, or if it is equal to the sum from a function of the reduced speed and a quantity proportional to the temperature difference between the actual and the normal (N) inlet temperature of the engine, such as $T_{t4\ spec} = f(N_1 \sqrt{T_{t1}}) + k_2(T_{t1} - T_{t1N})$, where $k_2$ is a constant value and $T_{t1N} = +20°$ C. $= 293°$ K. ($N$ = standard day). In each of these cases the place of the specified value $T_{t4\ spec}$ can be taken by the specified value of some other engine temperature, such as the gas inlet temperature $T_{t3}$ of the gas generator turbine.

In accordance with a further feature of the invention, the specified value applied the temperature regulator (unit 13) is limited to a maximum and this maximum is varied as a function of the speed of the gas generator shaft (unit 12) preferably using the gas outlet temperature of the gas generator turbine as a controlled variable to maintain the gas inlet temperature of the gas generator turbine at an approximately constant level.

In a preferred embodiment of the present invention, the control range of the temperature regulator (unit 13) is reduced by superimposing (unit 16) on the output signal which is a guide vane signal ($\Delta\alpha 1$) of this temperature regulator a signal ($\alpha 1$) which varies with the reduced speed of the gas generator shaft for compensation of disturbance.

It is advantageous that when during acceleration of the gas generator, the power turbine guide vanes are opened sufficiently to achieve optimum conditions for the torque-speed characteristic at the free power turbine. More particularly, an acceleration signal ($\Delta\alpha_B$) which varies with the speed difference $\Delta n_1 = N_1\ spec - N_1\ act.$ is for this purpose superimposed additively or alternatively upon the guide vane signal ($\Delta\alpha_1 + \alpha_1$) formed by the temperature regulator and the compensating unit. The guide vanes are likewise opened during deceleration of the gas generator by means of a deceleration signal ($\Delta\alpha_V$) which varies with $\Delta N_1$ for more rapidly reducing the power. For more rapid changes in the power during acceleration and deceleration, then, an acceleration or deceleration signal which varies with $N_1$ is superimposed additively in one embodiment or alternatively in another embodiment (units 14, 15 and 14', 15') on the guide vane signal ($\Delta\alpha_1 + \alpha_1$) to open these guide vanes. The acceleration signal and the deceleration signal are preferably formed separately, i.e., independently of one another. Also, the acceleration signal or the deceleration signal preferably becomes effective only after a predetermined thereshold value of the speed of the generator shaft is exceeded. It is an advantage, for the purpose of limiting the flow area of the said row of inlet guide vanes to a maximum during acceleration and deceleration, to limit the guide vane signal ($\alpha_2$) formed by the guide vane signal ($\Delta\alpha_1$) of the temperature regulator, by the compensation signal for disturbance ($\alpha_1$) and by the acceleration or deceleration signal ($\Delta\alpha_B$, $\Delta\alpha_V$), in the additive case to an adjustable maximum value ($\alpha_{maxB, V}$) and in the said alternative case to a maximum value ($\alpha_{Bmax}$) during acceleration and to another maximum value ($\alpha_{Vmax}$) during deceleration. It is also advantageous to override, in the lower speed range, the guide vane signal ($\alpha_2$) formed by the said three signals with a signal ($\alpha_3$) which varies with the speed ($N_1$) or the changed speed (($N_1/\sqrt{T_{t1}}$) act) of the gas generator shaft usng a logical selector circuit (unit 19). In this manner the gas generator is wide open from engine start through idling speed and the torque in the power turbine shaft is kept low. The guide vane signal ($\alpha_3$) corresponds to a wide open position of the gas generator in the range up to and including idling speed of the gas generator shaft, it is constant and beginning at approximately the idling speed, it is varied within a relatively narrow speed range of the gas generator shaft towards a minimum value ($\alpha_{min}$) of the flow area of the row of inlet guide vanes.

To prevent the engine from overheating if the temperature regulator (unit 13) should fail, it is advantageous to use a switch and a logical selector circuit (unit 19) to ensure a constant guide vane position ($\alpha T_{t4fail}$), i.e., to adjust the guide vanes such that the engine is protected from overheating while sufficient power is still ensured for emergency service. It is also helpful to use a logical selector circuit, particularly the circuit (unit 19) to adjust for a minimum value ($\alpha_{min}$) of the flow area of the row of inlet guide vanes for maximum protection against engine stall in the event of confusion in the signal generation process.

According to a further feature, it is useful, when a limit speed ($N_2max$) of the power turbine is exceeded, the limit speed being a certain percentage, for example, 10% over nominal speed ($N_{2N}$) for the power turbine, to superimpose (unit 20) a signal ($\Delta\alpha_{N2}$) additively or alternatively on the guide vane signal ($\alpha_4$) to protect the power turbine rotor from overspeeding. Such overspeed may occur, e.g., when traveling on downgrades. Additionally, it is advantageous to additively superimpose on the guide vane signal ($\alpha_4$) an extraneous signal ($\Delta\alpha_{Br}$) which varies with the position of an engine brake lever so as to continuously vary the power of the power turbine down into the braking range.

During coupling and shifting operations the guide vanes should often be positioned for maximum braking effect. Therefore, according to a feature of the present invention, a constant, large coupling and shifting signal (extraneous signal) ($\Delta\alpha_K$) is additively or alternatively superimposed on the guide vane position or the guide vane signal ($\alpha_4$) during coupling or shifting operations to achieve a maximum of brief braking effort at the power turbine. In order to prevent excessive constriction of the flow area in the braking range, it is useful to limit the guide vane position to a maximum braking position ($\alpha_{limit}$). It is advantageous if, when a maximum allowable gas inlet temperature ($T_{t6max}$) of the heat exchanger is exceeded, a limit temperature regulator (unit 17) reduces the restriction on the gas generator in the braking range by reducing the maximum braking position ($\alpha_{limit}$) of the guide vanes until this maximum allowable inlet temperature has returned to within the limits. This limit temperature regulator will affect the guide vane signal ($\alpha$) when the maximum allowable inlet temperature is exceeded also in the accelerating power range in that it ensures observance of this temperature by augmenting the guide vane signal ($\alpha$) also in the positive power range.

These and further objects, features and advantages of the present invention will become more obvious from the following description when taken in connection with the accompanying drawings which show, for purposes of illustration only, several embodiments in accordance with the present invention, and wherein.

Figure 1:
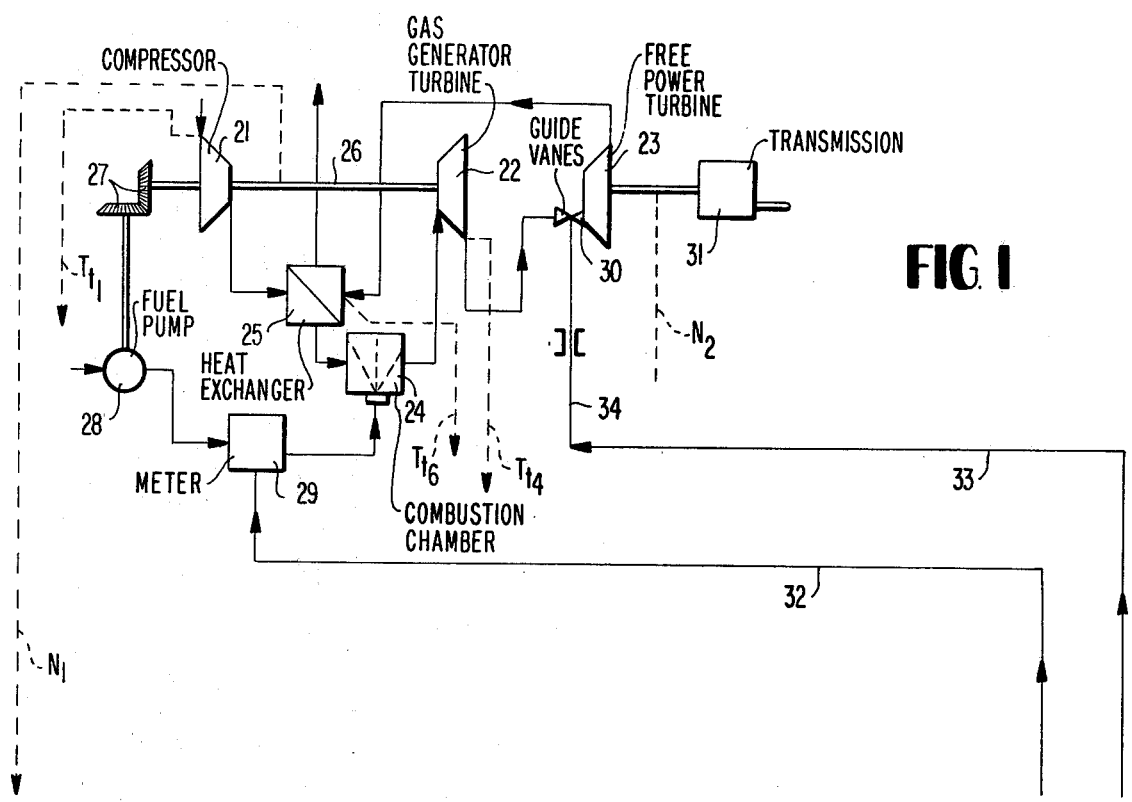
FIG. 1 illustrates a block diagram arrangement of a gas turbine engine utilizing a control device in accordance with the present invention and having a fuel control section and a guide vane control section.

Referring now to the drawings wherein like reference numerals a utilized to designate like parts throughout the several views, there is shown in FIG. 1 a vehicular gas turbine engine comprising an air compressor 21 driven by a gas generator turbine 22 which discharges into a free power turbine 23 having a row of variable inlet guide vanes 30, a combustion chamber 24, a heat exchanger 25 energized with outlet gas from the power turbine 23 for preheating the compressor discharge air flowing into the combustion chamber 24, a fuel pump 28 driven off a gas generator shaft 26 through a transmission 27, and a fuel metering device 29 for the combustion chamber 24. The power turbine 23 supplies effective power to the vehicle wheels through a transmission 31. Arrowheads are used to indicate the flow of air, gas and fuel, a fuel signal line 32 leading from the fuel control section of the control device to the fuel metering device 29, and a guide vane control line 33 leading from the guide vane control section of the control device to a guide vane actuating device 34 for the row of inlet guide vanes 30. The broken lines indicate the transmission to the control device of the speed $N_1$ of the gas generator shaft 26 and of the speed $N_2$ of the rotor of the power turbine 23, of the inlet or air inlet temperature $T_{t1}$ of the engine or of the compressor 21, of the gas exhaust temperature $T_{t4}$ of the gas generator turbine 22 and of the gas inlet temperature $T_{t6}$ of the heat exchanger 25.

Figure 2:
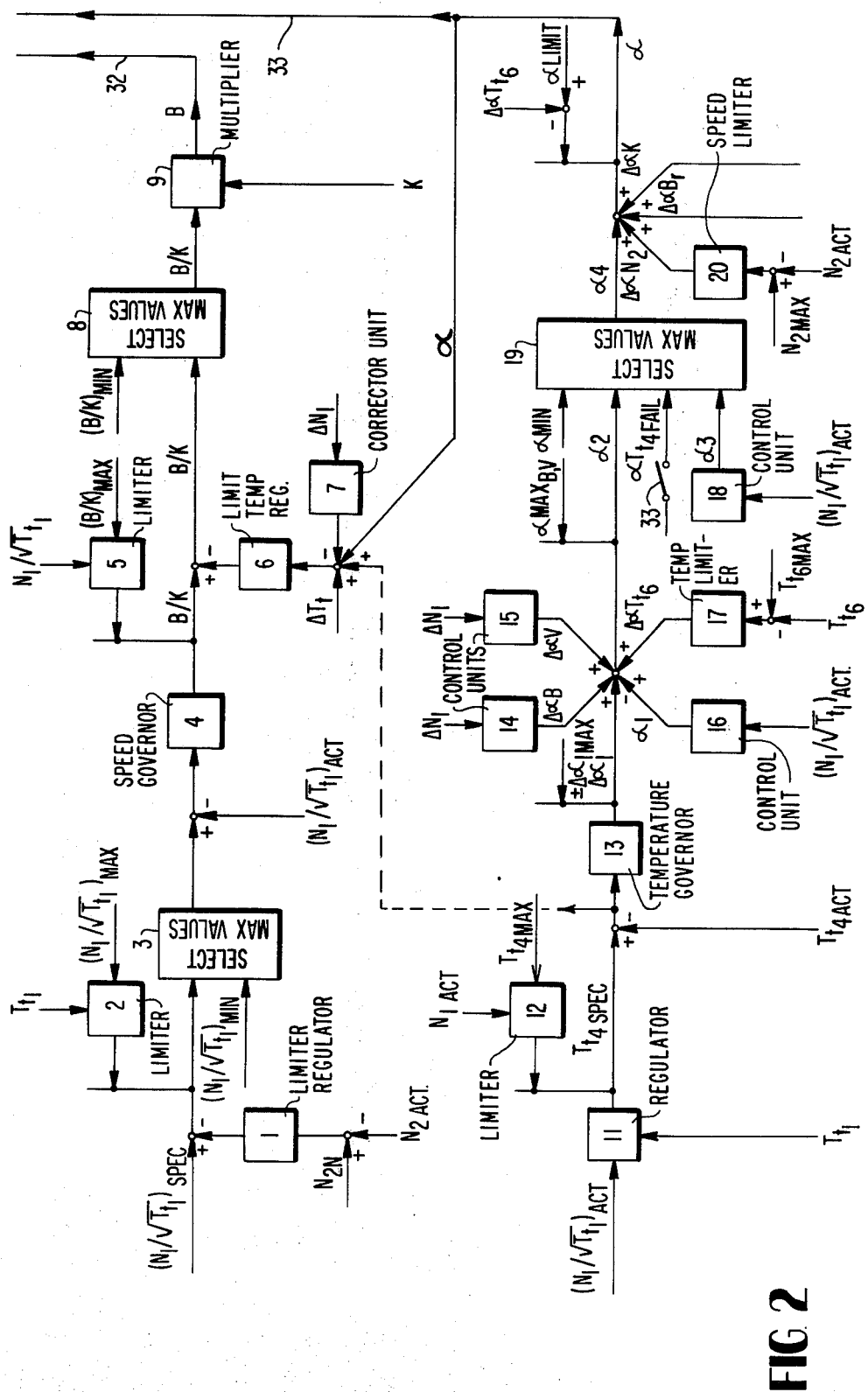
FIG. 2 illustrates a block diagram arrangement of the control system for a vehicular gas turbine engine of FIG. 1.

With reference to FIG. 2, the control system includes the fuel control section having the units 1-9, and the guide vane control section having the units 11-20. The unit 4 represents the speed governor, the unit 13 the temperature regulator which changes the throughput through the gas generator by varying the guide vanes so as to effect the throttled condition of the gas generator. The controlled variable of the speed governor 4 is the speed $N_1$, and the controlled variable of the temperature regulator 13 is the outlet gas temperature $T_{t4}$.

In the fuel control section, $N_1/\sqrt{T_{t1}}$ is the reduced speed of the gas generator shaft 26 and $N_{2act}$ is the actual speed of the rotor of the power turbine 23. The unit 1 represents a limit regulator which reduces the specified speed value $(N_1/\sqrt{T_{t1}})$ of the gas generator shaft 26 when the nominal speed $N_{2N}$ of the power turbine rotor is exceeded. The specified speed value $(N_1/\sqrt{T_{t1}})$ is provided in accordance with each operating position of a power lever for the engine. The unit 2 represents a limiter which makes certain that the maximum value of the reduced speed, i.e. $(N_1/\sqrt{T_{t1}})_{max}$, is changed as a function of the inlet temperature $T_{t1}$. The unit 3 represents a logical selector circuit which ensures observance of the minimum speed $(N_1/\sqrt{T_{t1}})_{min}$ of the gas generator shaft 26.

The incoming specified value of the controlled variable $(N_1/\sqrt{T_{t1}})_{spec}$ is compared with the actual value of the controlled variable $(N_1/\sqrt{T_{t1}})_{act}$ by the speed governor 4. The manipulated variable or the output quantity of the speed governor 4 is changed by a limit temperature regulator unit 6. The specified value of the limit temperature regulator 6 is formed from the specified value $T_{t4spec}$ supplied to the temperature regulator 13 and from a corrective value $\Delta T_t$ and is corrected by unit 7 as a function of the speed difference $\Delta N_1$. Additionally, the specified value of the limit temperature regulator 6 is also corrected as a function of the position of the guide vanes.

The output quantity of the speed governor 4 is quotient B/K, where B is the fuel flow and K a single or plural engine characteristic. The unit 9 is a multiplier circuit in which this output quantity is multiplied by K. $(B/K)_{max}$ indicates the maximum and $(B/K)_{min}$ the minimum value of the output quantity of the speed governor 4. This maximum value is changed by the reduced speed $N_1/\sqrt{T_{t1}}$ in a limiting device represented by the unit 5. The unit 8 represents a logical selector circuit which selects the greater of the signals B/K and $(B/K)_{min}$.

In the guide vane control section the unit 11 serves to vary the specified value of the gas outlet temperature $T_{t4spec}$ as a function of the inlet temperature $T_{t1}$ and the reduced speed $(N_1/\sqrt{T_{t1}})_{act}$. The maximum value of this specified value, i.e. $T_{t4max}$ is varied in unit 12 as a function of the speed $N_{1act}$ and therefore the unit 12 represents a limiter regulator. The so-formed specified value of the controlled variable $T_{t4spec}$ is compared by the temperature regulator 13 with the actual value of the controlled variable $T_{t4act}$. The output quantity or the output signal $\Delta\alpha_1$ of the temperature regulator 13 is limited to a positive and a negative maximum value $\Delta\alpha_{1max}$. The output signal $\Delta\alpha_1$ is superimposed with a signal $\alpha_1$ which varies with the reduced speed $(N_1/\sqrt{T_{t1act}})$—by means of the unit 16—on the output signal $\Delta\alpha_1$ and the guide vane signal $\Delta\alpha_1+\alpha_1$ is superimposed with separately formed signals $\Delta\alpha_B$ and $\Delta\alpha_V$ which vary with $\Delta N_1$—by means of units 14 and 15. $\alpha_{maxB, V}$ is the maximum value to which a so-formed guide vane signal $\alpha_2$ is limited. Units 18 and 19 represent the dependence of a signal $\alpha_3$ on the reduced speed $(N_1/\sqrt{T_{t1}})_{act}$ and how the signal $\alpha_2$ is overridden by the signal $\alpha_3$. Overrriding is effected by means of the logical selector circuit represented by unit 19. The signal $\alpha T_{t4fail}$ represents the guide vane position ensured by means of a switch 33 and the logical selector circuit 19 if the temperature regulator 13 should fail. $\alpha_{min}$ represents a minimum value of the flow area at the row 30 of inlet guide vanes.

The unit 20 represents a limit speed governor which serves to superimpose, at a limit speed $N_{2max}$ of the power turbine rotor, an overspeed protection signal $\Delta\alpha_{N2}$ for the power turbine rotor on a guide vane signal $\alpha_4$ provided as an output of the logical selector circuit 19. Superimposed further on the resultant guide vane signal $\alpha$ are the engine special brake lever signal $\Delta\alpha_{Br}$ and the coupling and shifting signal $\Delta\alpha_K$. The unit 17 represents a limit temperature regulator which, when the maximum allowable gas inlet temperature $T_{t6max}$ is exceeded, reduces the restriction on the gas generator in the braking range by reducing the maximum braking position $\alpha_{limit}$ while in the positive power range it augments the guide vane signal. Both effects are achieved by superimposing a signal $\Delta\alpha_{T6}$.

Figure 3:
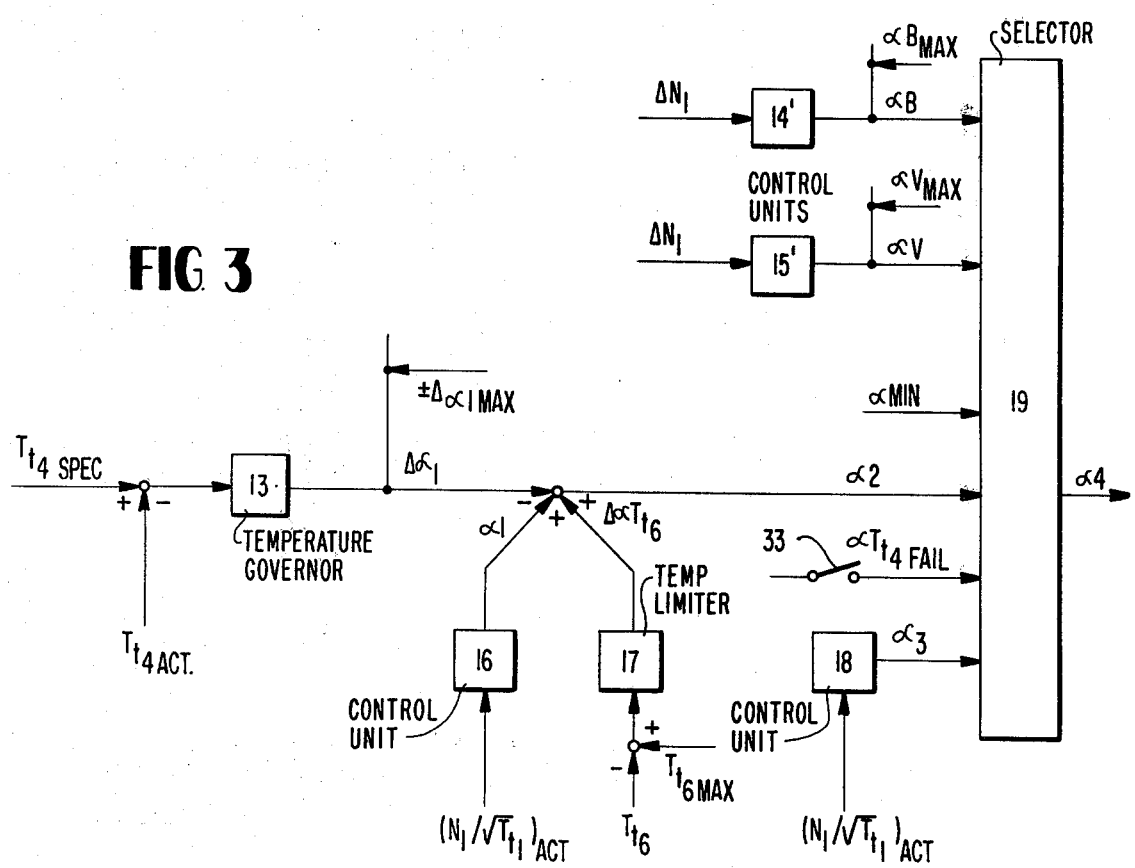
FIG. 3 illustrates in block diagram form an alternative embodiment of the guide vane control section in accordance with the present invention.

FIG. 3 illustrates a modification of the guide vane control section of FIG. 2, wherein in FIG. 2 the schedules 14 and 15 perform additive superimposition, the schedules 14' and 15' in FIG. 3 use alternative superimposition of the acceleration signal $\alpha_B$ and the deceleration signal $\alpha_V$. In this case, use is made of a separate limitation $\alpha_{Bmax}$ or $\alpha_{Vmax}$ for each signal utilized.

Obviously, many modification and variations of the present invention are possible in the light of the above teachings and it should be noted that although a detailed description of units 1-20 has not been provided for clarity of description of the present invention, such units may be constructed of conventional components in a manner known in the art in accordance with the above teachings. It should therefore be understood that within the scope of the appended claims, the invention may be practiced otherwise than as specifically described.

What is claimed is:

1. Control system for a gas turbine engine, especially for a vehicular gas turbine engine, having a gas generator means including a combustion air compressor and a gas turbine on a common gas generator shaft, a combustion chamber, and a free power turbine, variable guide vanes being arranged at the inlet of said free power turbine, the control system including speed governor means responsive to a controlled variable which is the speed $N_1$ of the gas generator shaft for providing an output signal for controlling fuel flow to the engine, and temperature governor means responsive to a controlled variable which is a gas temperature T of the gas generator means for providing an output signal for controlling the positioning of the guide vanes, and varying means responsive to engine characteristics for varying the controlled variables and the output signals of said speed governor means and said temperature governor means as a function of engine characteristics, said varying means varying the controlled variable $N_1$ in accordance with the input temperature $T_{t1}$ of the engine and varying the controlled variable T in accordance with the input temperature $T_{t1}$ and the speed $N_1$ of the gas generator shaft, said varying means varying the output signal of said speed governor means in accordance with the input temperature $T_{t1}$ of the engine, one of the gas turbine inlet temperature $T_{t3}$ and outlet temperature $T_{t4}$ of the gas generator means, and a multiplier K representing at least one characteristic of the engine, and said varying means varying the output signal of said temperature governor means in accordance with the difference between the specified speed $N_{1spec}$ and the actual speed $N_{1act}$ of the gas generator shaft.

2. Control system according to claim 1, wherein said gas turbine engine further comprises a compressor air to exhaust gas heat exchanger.

3. Control system according to claim 1, wherein said means for varying includes logical selector circuit means receiving an input of the specified speed value and an input of a minimum speed value for providing an output to said speed governor means in accordance with the larger of the input values to ensure a minimum speed of said gas generator shaft.

4. Control system according to claim 1, including a movable power lever means having a plurality of positions and said means for varying varies the speed value $N_1$ of said gas generator shaft as a function of inlet temperatures $T_{t1}$ to provide a changed specified speed value at each position of said power lever means for changing the influence of the inlet temperature $T_{t1}$ on the performance of the engine.

5. Control system according to claim 4, wherein said means for varying varies the speed $N_1$ in proportion to the square root of the inlet temperature $T_{t1}$ to provide a specified changed speed value $N_1/\sqrt{T_{t1}}$ for each position of said power lever means.

6. Control system according to claim 5, wherein said reduced speed value is $N_1/\sqrt{T_{t1}}$.

7. Control system according to claim 4, wherein said means for varying includes maximum value means for varying the maximum value of the changed specified speed value as a function of the inlet temperature $T_{t1}$ for limiting the maximum possible power of the engine.

8. Control system according to claim 4, wherein said means for varying includes logical selector circuit means receiving an input of the specified speed value and an input of a minimum speed value for providing an output to said speed governor means in accordance with the larger of the input values to ensure a minimum speed of said gas generator shaft.

9. Control system according to claim 1, wherein said means for varying includes reducing means for reducing the specified value of the speed of said gas generator shaft in response to nominal speed of said power turbine being exceeded so as to control the nominal speed of said power turbine.

10. Control system according to claim 1, including limit temperature regulator means for reducing the output signal of said speed governor means for limiting the fuel flow during acceleration of said gas generator.

11. Control system according to claim 10, wherein said limit temperature regulator means is responsive to one of a difference value between a specified input temperature value and an actual temperature value applied to said temperature governor means and of a value formed from the difference value and a corrective value.

12. Control system according to claim 11, wherein said temperature governor means is responsive to one of the gas inlet and output temperatures of said gas generator turbine as the controlled variable, and including means for correcting the difference value between the specified and actual temperature values in accordance with the difference value between the specified and actual speeds of said gas generator shaft.

13. Control system according to claim 10, wherein said limit temperature regulator means is responsive to the correction signal which is a function of the position of said guide vanes.

14. Control system according to claim 10, including means for multiplying one of the output signal of said speed governor means and said reduced output signal formed by said speed governor means and said limit temperature regulator means by at least one engine characteristic for improving the stability of at least one of said speed governor means and said limit temperature regulator means.

15. Control system according to claim 14, including limiter means for limiting the output signal of said speed governor means to at least one of a maximum and a minimum output signal value.

16. Control system according to claim 15, wherein said limiter means for limiting the output signal to a maximum value is varied in accordance with at least one of a signal of at least one engine characteristic and an extraneous signal at least in the starting speed range of the engine.

17. Control system according to claim 16, wherein said maximum limiter means is varied over the entire speed range of the engine.

18. Control system according to claim 17, including a movable power lever means having a plurality of positions and said means for varying varies the speed value of the gas generator shaft as a function of inlet temperatures $T_{t1}$ to provide a changed speed value at each position of said power lever means, said changed speed value being the plural engine characteristic applied to said maximum limiter means.

19. Control system according to claim 18, wherein the changed speed value is $N_1/\sqrt{T_{t1}}$.

20. Control system according to claim 1, wherein for stationary regulation of the gas temperature of said gas generator turbine, said means for varying includes regulating means for controlling the specified temperature value of the gas generator means applied to said temperature governor means as a function of at least one of the engine inlet temperature value and the reduced speed value.

21. Control system according to claim 1, wherein said means for varying includes limiting means for limiting the specified temperature value of the gas generator means for application to said temperature governor means to a maximum temperature value, said maximum limiting means varying the maximum value as a function of the speed of the generator shaft.

22. Control system according to claim 1, wherein for reducing the control range of said temperature governor means, said means for varying includes compensating means providing a compensating signal which varies as a function of the changed speed value and for superimposing the compensating signal on the output signal of said temperature regulator means as a compensation for disturbance.

23. Control system according to claim 1, wherein for more rapid change in power during acceleration and deceleration, said means for varying includes acceleration and deceleration means providing at least one of an acceleration and decelaration signal which varies with the difference between the specified and actual speeds of said gas generator shaft; said acceleration and deceleration means one of additively and alternatively superimposing at least one of the acceleration and deceleration signals on the output signal of said temperature governor means for controlling said guide vanes.

24. Control system according to claim 23, wherein said acceleration means is separate from said deceleration means.

25. Control system according to claim 23, wherein said acceleration and deceleration means is responsive to the exceeding of a predetermined threshold value of the speed of said gas generator shaft for providing the acceleration and deceleration signals for superimposition.

26. Control system according to claim 23, wherein said means for varying includes guide vane signals limiting means for limiting the guide vane signal formed from at least the output signal of said temperature governor means, and the at least one of the acceleration signal and the deceleration signal to a first maximum value when the acceleration and deceleration signals are additively superimposed and to second and third maximum values when the acceleration and deceleration signals are alternatively superimposed during acceleration and deceleration, respectively.

27. Control system according to claim 23, wherein said means for varying includes overriding means providing an overriding signal in the lower speed range in accordance with one of the speed and changed speed values of said gas generator shaft, and logical selector circuit means for selecting one of the overriding signal and the guide vane signal formed from the output signal of said temperature regulator means, the compensating signal and at least one of the acceleration and deceleration signal to provide an output guide vane signal.

28. Control system according to claim 27, wherein said overriding signal means provides an overriding signal having a constant portion which corresponds, up to and including the idling speed of the gas generator shaft to a wide open condition of said gas generator means and a variable portion which varies beginning at the idling speed within a relatively narrow speed range of the gas generator shaft towards a minimum value of the flow area of said inlet guide vanes.

29. Control system according to claim 27, wherein said logical selector circuit means receives a constant guide vane signal for selection in the case of failure of said temperature governor means.

30. Control system according to claim 27, wherein said logical selector circuit means receives a signal corresponding to a minimum value of the flow area of said inlet guide vane means.

31. Control system according to claim 1, wherein said means for varying includes speed limit means responsive to a predetermined limit speed of said free power turbine being exceeded for one of additively and alternatively superimposing a limiting signal on the output guide vane signal of a logical selector circuit means for preventing overspeeding of said free power turbine.

32. Control system according to claim 31, wherein the predetermined limit speed is a predetermined percentage over the nominal speed of the free power turbine.

33. Control system according to claim 27, wherein said means for varying includes braking signal means for providing a braking signal which varies with the position of an engine brake lever and for additively superimposing the braking signal on the output guide vane signal of said logical selector circuit means for continuously varying the power of the free power turbine down into the braking range.

34. Control system according to claim 27, wherein said means for varying includes coupling signal means providing a constant coupling and shifting signal for superimposition on the output guide vane signal of said logical selector circuit means to achieve a maximal brief braking effect at the free power turbine.

35. Control system according to claim 27, wherein said means for varying includes guide vane limit means for limiting the variation of the guide vanes to a maximum braking position.

36. Control system according to claim 1, wherein said means for varying includes limit temperature means responsive to the exceeding of a maximum allowable inlet temperature of said heat exchanger for reducing the restriction on the gas generator means in the braking range by reducing the maximum braking position of the guide means by superimposing a signal on the output signal of said temperature regulator means.

37. Control system according to claim 36, wherein said limit temperature means also is responsive to the exceeding of the maximum allowable inlet temperature of said heat exchanger for superimposing a signal on the output signal of said temperature regulator means in the range of positive power.

38. Control system according to claim 20, wherein said temperature governor means provides the specified temperature value of the gas generator means as an output signal which is proportional to the product of the inlet temperature value of the engine and a function of the changed speed value.

39. Control system according to claim 20, wherein said temperature governor means provides the specified temperature value of the gas generator means as an output signal which is equal to the sum of a function of the reduced speed value and a quantity value which is proportional to the temperature difference between the actual and normal inlet temperature value of the engine.

40. Control system according to claim 5, wherein said means for varying includes maximum value means for varying the maximum value of the changed specified speed value as a function of the inlet temperature $T_{t1}$ for limiting the maximum possible power of the engine.

41. Control system according to claim 40, wherein said means for varying includes reducing means for reducing the specified value of the speed of said gas generator shaft in response to nominal speed of said power turbine being exceeded so as to control the nominal speed of said power turbine.

42. Control system according to claim 41, wherein said means for varying includes logical selector circuit means receiving an input of the specified speed value and an input of a minimum speed value for providing an output to said speed governor means in accordance with the larger of the input values to ensure a minimum speed of said gas generator shaft.

43. Control system according to claim 42, wherein said means for varying includes limit temperature regulator means for reducing the output signal of said speed governor means for limiting the fuel flow during acceleration of said gas generator.

44. Control system according to claim 43, wherein said limit temperature regulator means is responsive to one of a difference between a specified input temperature value and an actual temperature value applied to said temperature governor means and a corrective value.

45. Control system according to claim 44, wherein the specified input temperature value applied to said temperature governor means is the gas outlet temperature of said gas generator and said means for varying includes means for correcting the value of the limit temperature regulator means as a function of the difference between the specified and actual speeds of said gas generator shaft.

46. Control system according to claim 45, wherein said limit temperature regulator means is responsive to the correction signal which is a function of the position of said guide vanes.

47. Control system according to claim 46, wherein said means for varying includes means for multiplying one of the output signal of said speed governor means and said changed output signal formed by said speed governor means and said limit temperature regulator means by at least one engine characteristic for improving the stability of at least one of said speed governor means and said limit temperature regulator means.

48. Control system according to claim 47, wherein said means for varying includes limiter means for limiting the output signal of said speed governor means to at least one of a maximum and a minimum output signal value.

49. Control system according to claim 48, wherein said limiter means for limiting the output signal to a maximum value is varied in accordance with at least one of a signal of at least one engine characteristic and an extraneous signal at least in the starting speed range of the engine.

50. Control system according to claim 49, wherein said maximum limiter means is varied over the entire speed range of the engine.

51. Control system according to claim 50, including a movable power lever means having a plurality of positions and said means for varying varies the speed value of the gas generator shaft as a function of inlet temperatures $T_{t1}$ to provide a changed speed value at each position of said power lever means, said changed speed value being the plural engine characteristic applied to said maximum limiter means.

52. Control system according to claim 20, wherein said means for varying includes limiting means for limiting the specified temperature value of the gas generator means for application to said temperature governor means to a maximum temperature value, said maximum limiting means varying the maximum value as a function of the speed of the generator shaft.

53. Control system according to claim 52, wherein for reducing the control range of said temperature governor means, said means for varying includes compensating means providing a compensating signal which varies as a function of the changed speed value and for superimposing the compensating signal on the output signal of said temperature governor means as a compensation for disturbance.

54. Control system according to claim 53, wherein for more rapid change in power during acceleration and deceleration, said means for varying includes acceleration and deceleration means providing at least one of an acceleration and deceleration signal which varies with the difference between the specified and actual speeds of said gas generator shaft; said acceleration and deceleration means one of additively and alternatively superimposing at least one of the acceleration and deceleration signals on the output signal of said temperature governor means for controlling said guide vanes.

55. Control system according to claim 54, wherein said acceleration means is separate from said deceleration means.

56. Control system according to claim 55, wherein said acceleration and deceleration means is responsive to the exceeding of a predetermined threshold value of the speed of said gas generator shaft for providing the acceleration and deceleration signals for superimposition.

57. Control system according to claim 56, wherein said means for varying includes guide vane signals limiting means for limiting the guide vane signal formed form the output signal of said temperature governor means, the compensating signal and the at least one of the acceleration signal and the deceleration signal to a first maximum value when the acceleration and deceleration signals are additively superimposed and to second and third maximum values when the acceleration and deceleration signals are alternatively superimposed during acceleration and deceleration, respectively.

58. Control system according to claim 57, wherein said means for varying includes overriding means providing an overriding signal in the lower speed range in accordance with one of the speed and changed speed values of said gas generator shaft, and logical selector circuit means for selecting one of the overriding signal and the guide vane signal formed from the output signal of said temperature governor means, the compensating signal and at least one of the acceleration and deceleration signals to provide an output guide vane signal.

59. Control system according to claim 58, wherein said overriding signal means provides an overriding signal having a constant portion which corresponds, up to and including the idling speed of the gas generator shaft to a wide open condition of said gas generator means and a variable portion which varies beginning at the idling speed within a relatively narrow speed range of the gas generator shaft towards a minimum value of the flow area of said inlet guide vanes.

60. Control system according to claim 59, wherein said logical selector circuit means receives a constant guide vane signal for selection in the case of failure of said temperature governor means.

61. Control system according to claim 60, wherein said logical selector circuit means receives a signal corresponding to a minimum value of the flow area of said inlet guide vane means.

62. Control system according to claim 61, wherein said means for varying includes speed limit means responsive to a predetermined limit speed of said free power turbine being exceeded for one of additively and alternatively superimposing a limiting signal on the output guide vane signal of said logical selector circuit means for preventing overspeeding of said free power turbine.

63. Control system according to claim 62, wherein the predetermined limit speed is a predetermined percentage over the nominal speed of the free power turbine.

64. Control system according to claim 63, wherein said means for varying includes braking signal means for providing a braking signal which varies with the position of an engine brake lever and for additively superimposing the braking signal on the output guide vane signal of said logical selector circuit means for continuously varying the power of the free power turbine down into the braking range.

65. Control system according to claim 64, wherein said means for varying includes coupling signal means providing a constant coupling and shifting signal for superimposition on the output guide vane signal of said logical selector circuit means to achieve a maximal brief braking effect at the free power turbine.

66. Control system according to claim 65, wherein said means for varying includes guide vane limit means for limiting the variation of the guide vanes to a maximum braking position.

67. Control system according to claim 66, wherein said means for varying includes limit temperature means responsive to the exceeding of a maximum allowable inlet temperature of said heat exchanger for reducing the restriction on the gas generator means in the braking range by reducing the maximum braking position of the guide means by superimposing a signal on the output signal of said temperature regulator means.

68. Control system according to claim 67, wherein said limit temperature means also is responsive to the exceeding of the maximum allowable inlet temperature of said heat exchanger for superimposing a signal on the output signal of said temperature regulator means in the range of positive power.

69. Control system according to claim 68, wherein said regulating means provides the specified temperature value of the gas generator means as an output signal which is proportional to the product of the inlet temperature value of the engine and a function of the reduced speed value.

70. Control system according to claim 69, wherein said regulating means provides the specified temperature value of the gas generator means as an output signal which is equal to the sum of a function of the reduced speed value and a quantity value which is proportional to the temperature difference between the actual and normal inlet temperature value of the engine.

* * * * *